United States Patent
Sachs et al.

(10) Patent No.: US 10,732,594 B2
(45) Date of Patent: Aug. 4, 2020

(54) METHOD FOR OPERATING SAFETY CONTROL IN AN AUTOMATION NETWORK, AND AUTOMATION NETWORK HAVING SUCH SAFETY CONTROL ALLOWING MIXED SAFETY INTEGRITY LEVELS

(71) Applicant: BECKHOFF AUTOMATION GMBH, Verl (DE)

(72) Inventors: Jens Sachs, Petershagen (DE); Frank Schiller, Nürnberg (DE); Holger Büttner, Berlin (DE)

(73) Assignee: Beckhoff Automation GmbH, Verl (DE)

(*) Notice: Subject to any disclaimer, the term of this patent is extended or adjusted under 35 U.S.C. 154(b) by 321 days.

(21) Appl. No.: 15/419,661

(22) Filed: Jan. 30, 2017

(65) Prior Publication Data

US 2017/0139388 A1  May 18, 2017

Related U.S. Application Data

(63) Continuation of application No. PCT/EP2015/068084, filed on Aug. 5, 2015.

(30) Foreign Application Priority Data

Aug. 8, 2014 (DE) .................. 10 2014 111 361

(51) Int. Cl.
G05B 19/042 (2006.01)
G05B 19/05 (2006.01)
H04L 1/00 (2006.01)

(52) U.S. Cl.
CPC ....... *G05B 19/0425* (2013.01); *G05B 19/054* (2013.01); *H04L 1/00* (2013.01);
(Continued)

(58) Field of Classification Search
None
See application file for complete search history.

(56) References Cited

U.S. PATENT DOCUMENTS

| 5,615,106 A * | 3/1997 | Yoshino | G05B 19/0423 700/19 |
| 6,891,850 B1 * | 5/2005 | Vandesteeg | G05B 19/0423 370/466 |

(Continued)

FOREIGN PATENT DOCUMENTS

| CN | 102655445 A | 9/2012 |
| CN | 102673504 A | 9/2012 |

(Continued)

OTHER PUBLICATIONS

Soressi, Ernesto, Introduction in safety rules EN954-1, EN13849 and EN62061 [online], Feb. 14, 2011 [retrieved on Dec. 28, 2018] Retrieved from the Internet <URL: https://ieeexplore.ieee.org/document/5712328?arnumber=5712328> Electronic ISBN: 978-1-84919-303-0 (Year: 2011).*

(Continued)

*Primary Examiner* — Robert E Fennema
*Assistant Examiner* — Jonathan Michael Skrzycki
(74) *Attorney, Agent, or Firm* — Dorsey & Whitney LLP

(57) ABSTRACT

A method operates a safety control in an automation network having a master subscriber which carries out the safety control, at least one first slave subscriber which is assigned a first safety integrity level, and at least one second slave subscriber which is assigned a second safety integrity level. The first safety integrity level and the second safety integrity level differ from each other. A first safety code determination method is assigned to the first slave subscriber and a second safety code determination method is assigned to the second slave subscriber. The first safety code determination method and the second safety code determination method differ from (Continued)

each other. The master subscriber and the first slave subscriber use the first safety code determination method for interchanging a safety data block. The master subscriber and the second slave subscriber use the second safety code determination method for interchanging a safety data block.

11 Claims, 5 Drawing Sheets

(52) U.S. Cl.
CPC .............. *G05B 2219/14012* (2013.01); *G05B 2219/2231* (2013.01); *G05B 2219/24008* (2013.01); *G05B 2219/25157* (2013.01); *G05B 2219/25232* (2013.01); *G05B 2219/33273* (2013.01)

(56) References Cited

U.S. PATENT DOCUMENTS

| 7,870,299 | B1 | 1/2011 | Sorensen et al. |
| 2003/0009610 | A1 | 1/2003 | Nolan et al. |
| 2012/0239256 | A1* | 9/2012 | Hammerschmidt .. H04L 1/0061 701/45 |
| 2012/0266053 | A1 | 10/2012 | Kang et al. |
| 2016/0313719 | A1* | 10/2016 | Sugiyama ............ G05B 19/058 |

FOREIGN PATENT DOCUMENTS

| DE | 102007028767 A1 | 12/2008 |
| DE | 102009054155 A1 | 5/2011 |
| DE | 102010009458 A1 | 9/2011 |
| EP | 0905594 A1 | 3/1999 |
| WO | 2004097539 A1 | 11/2004 |
| WO | 2016020449 A1 | 2/2016 |

OTHER PUBLICATIONS

First Office Action for Chinese Patent Application No. 201580042630.8, dated Dec. 13, 2018 (10 pages).

* cited by examiner

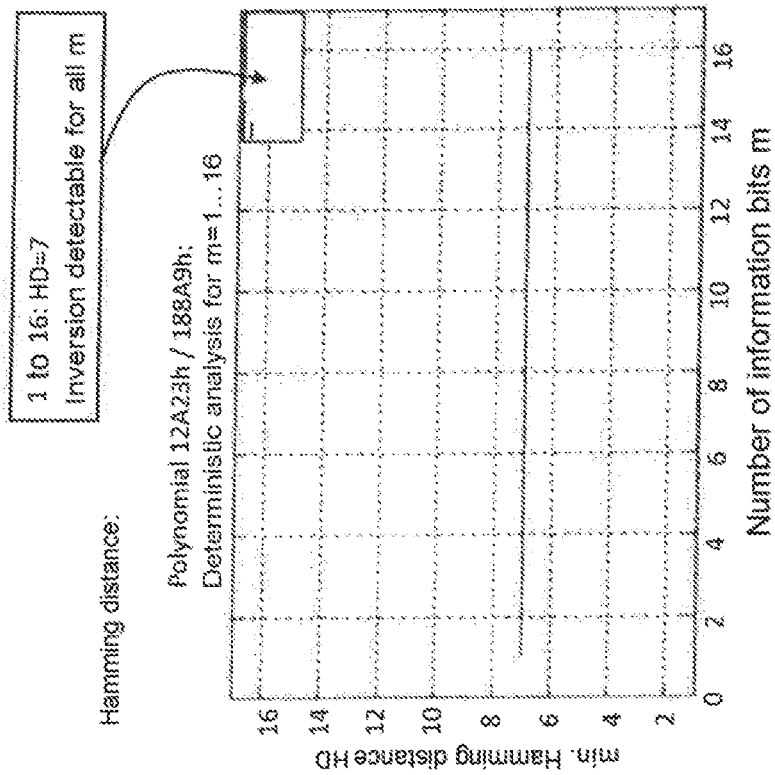
Fig. 3A
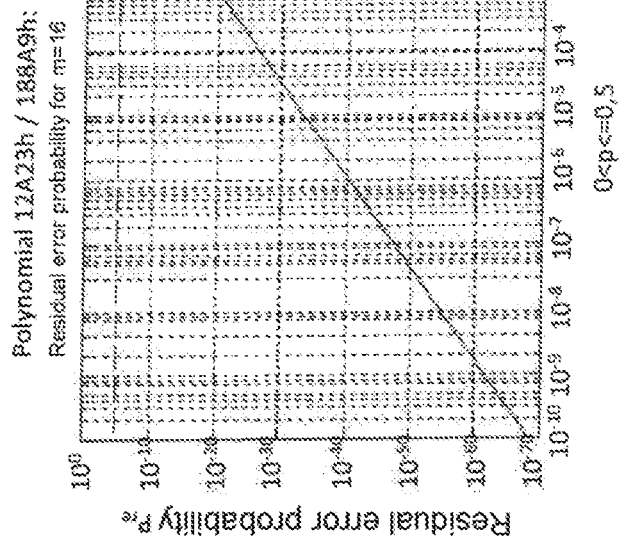

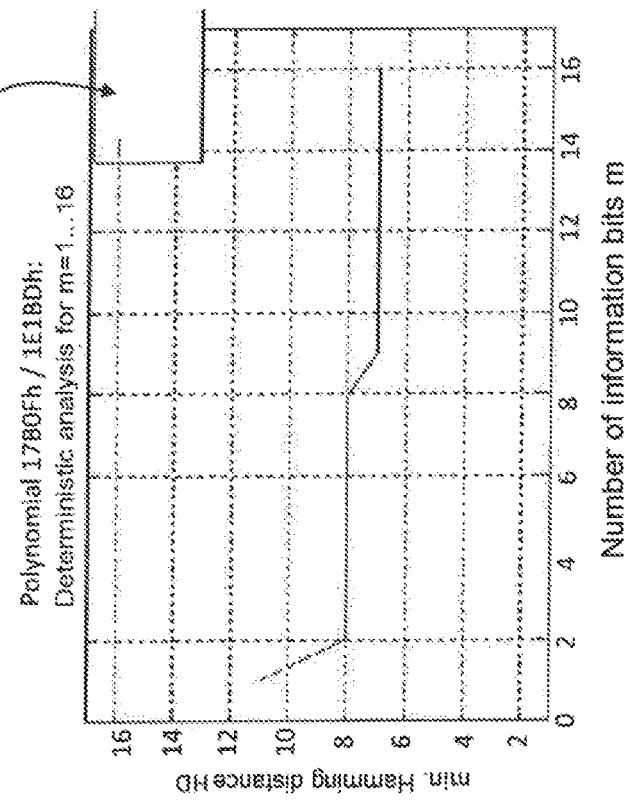
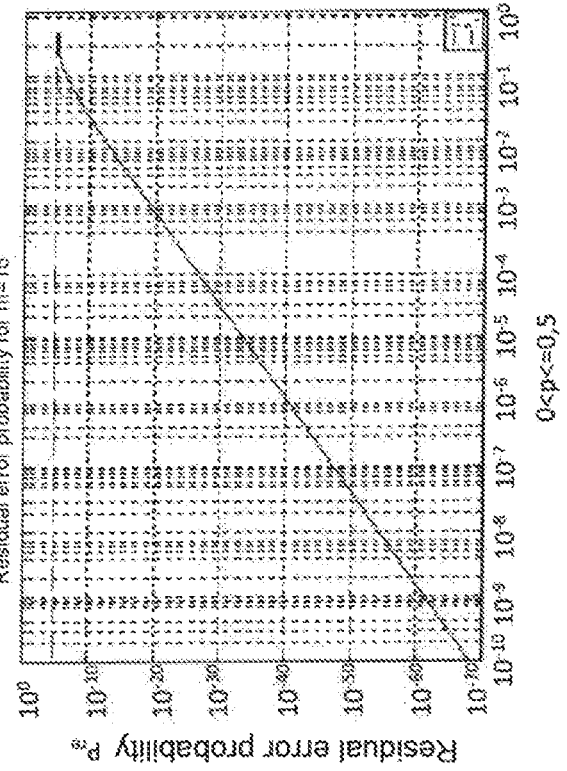
Fig. 3B

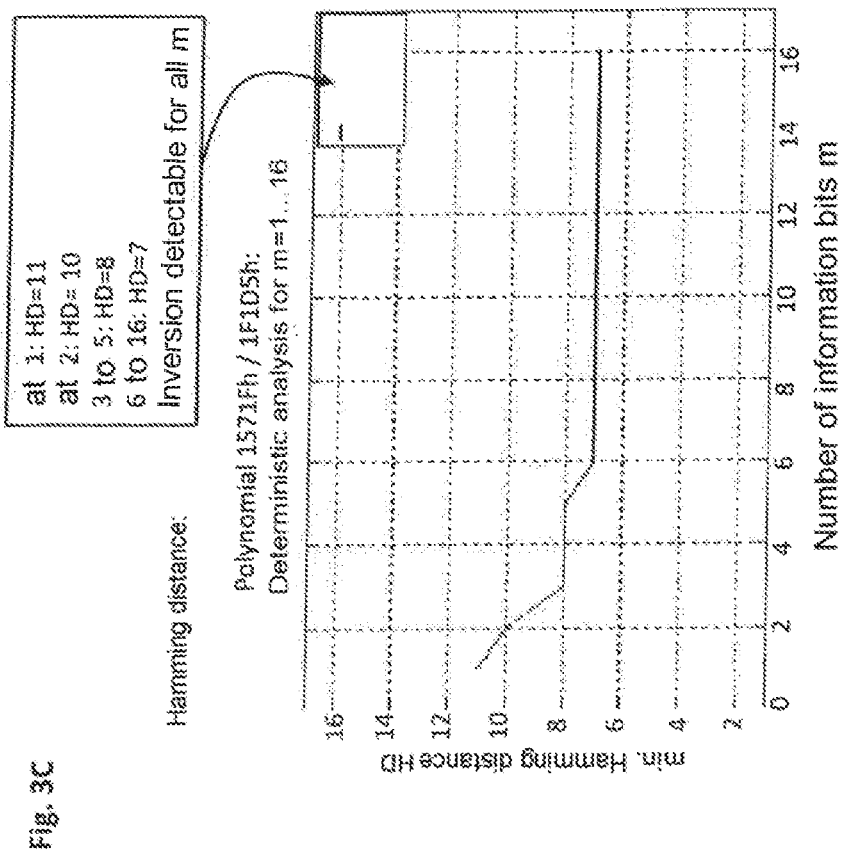
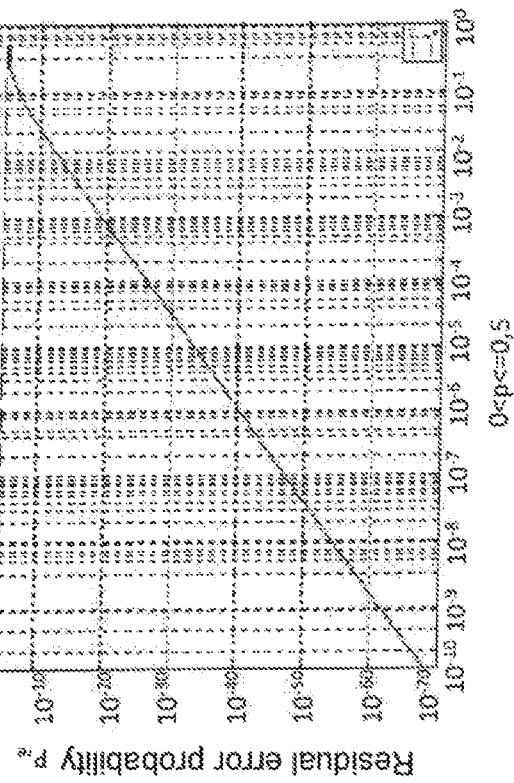
Fig. 3C

METHOD FOR OPERATING SAFETY CONTROL IN AN AUTOMATION NETWORK, AND AUTOMATION NETWORK HAVING SUCH SAFETY CONTROL ALLOWING MIXED SAFETY INTEGRITY LEVELS

CROSS-REFERENCE TO RELATED APPLICATIONS

This application is a continuation of International Patent Application No. PCT/EP2015/068084, filed Aug. 5, 2015, which claims priority to German Patent Application DE 10 2014 111 361.6, filed Aug. 8, 2014, each of which is incorporated by reference herein, in the entirety and for all purposes.

FIELD

This disclosure relates to a method for operating safety control in an automation network having a master subscriber and a plurality of slave subscribers, which are assigned different safety integrity levels, and to an automation network having such safety control.

BACKGROUND

Modern concepts of industrial automation, that is to say the control and monitoring of technical processes with the aid of software, are based on the idea of central control with a distributed sensor/actuator level. In this case, the subscribers communicate with one another and with superordinate systems via industrial local networks, also referred to as automation networks below. The control function is based on two fundamental ideas: the geographical decentralization and the hierarchical division of the control functions. In this case, the functional hierarchy divides the automation task substantially into a control level and a sensor/actuator level. The industrial local networks are usually in the form of so-called master/slave communication networks in which the master subscriber forms the control level and the slave subscribers form the sensor/actuator level.

An important requirement imposed on an automation network is fail-safety. When controlling and monitoring technical processes, it must be ensured that, when the automation network operates incorrectly, this does not result in any risk to humans and the environment. The automation network generally operates according to the so-called failsafe principle in which the automation network changes to a safe state in the event of a fault.

In order to be able to classify the danger from an automation network, there is an obligatory requirement to carry out a risk analysis. According to the European standard EN 1050, the risk assessment has to be carried out as a sequence of logical steps, which allows the systematic investigation of danger coming from the automation network or the individual subscribers. The technical and organizational requirements imposed on the automation network for the purpose of ensuring sufficient safety are then stipulated on the basis of the risk analysis.

In the field of machine and installation safety, in particular also of programmable electronic control systems, the standards EN ISO 13849-1 and IEC/EN 62061 have become established as the international standard for carrying out a danger analysis. The standards concomitantly include all safety-relevant subscribers irrespective of the subscriber type and subdivide the safety-related performance into categories. The control structure in the automation network is then stipulated on the basis of the determined safety category in order to achieve the requirements imposed on the safety functions and to achieve a required system behavior in the event of a fault.

The standards EN ISO 13849-1 and IEC/EN 62061 specify the safety-related performance of programmable electronic control systems which is needed to reduce the risk. For the purpose of subdividing the safety-related performance, the two standards define safety integrity levels. For this purpose, all safety functions of the automation network are considered with all subscribers involved in their execution.

The standard IEC/EN 62061 specifies four safety integrity levels (SIL) SIL1 to SIL4, in which case the individual levels are defined by the permissible residual error probability for the occurrence of an error. The safety integrity level SIL1 represents the lowest requirements according to the standard. The requirements then increase from level to level up to the safety integrity level SIL4. In this case, the safety integrity level of the automation network is determined on the basis of safety-related characteristic variables of the subscribers involved in the safety functions. In addition to the knowledge of the safety-related characteristic variables of all subscribers involved in the safety function, accurate information relating to the logical linking of the subscribers in the automation network is also needed to determine the safety integrity level of the automation network. The safety integrity level is also substantially influenced by the bus architecture used in the automation network.

Since the requirements imposed on the subscribers in an automation network with respect to the safety functions are often different, automation networks are generally operated with subscribers having a different SIL level. However, in such a case, the safety integrity level of the overall system is determined by the subscriber with the lowest SIL level. The reason for this is that data traffic between subscribers having a different SIL level in an automation network results in considerable safety-related problems. This is because, if a subscriber having a low SIL level transmits data packets to a subscriber having a high SIL level, a valid data packet for the receiving subscriber having a high SIL level may be generated even if a simple error occurs when generating the data packet in the transmitting subscriber, which error is permissible within the low SIL level of the transmitting subscriber. Although the error in the transmitted data packet is then detected in the receiver with a high degree of probability on account of its high SIL level, the possible data traffic with the subscriber having the low SIL level may then result in the compliance with the high SIL level required in the receiver no longer being able to be ensured since a data packet which is valid per se can be formed by the subscriber having the low SIL level.

Furthermore, when expanding an automation network with further safety-relevant subscribers, in particular when their SIL level differs from the SIL level of the other subscribers, it is generally necessary to reconfigure the overall system in order to prevent the safety functions to be executed by the subscribers already present in the automation system coming into conflict with the safety functions of the newly added subscribers. In this case, there is the risk, in particular, of the same addresses as those of old subscribers being allocated to new subscribers during address allocation, which may result in misdirection of data packets which are then not detected. Address allocation is complicated, in particular, when the addresses assigned to the subscribers in the data packets are transmitted only implicitly as part of safety codes, which are generated by a data protection mechanism, and/or cannot be determined from the outside.

The object of the present invention is to provide a method for operating safety control and an automation network, in which subscribers having any safety integrity level can be connected via the automation network without adversely affecting safety.

SUMMARY

The present invention provides a method for operating safety control and an automation network, in which subscribers having any safety integrity level can be connected via the automation network without adversely affecting safety.

According to one aspect, a method operates a safety control in an automation network having a master subscriber which carries out the safety control, at least one first slave subscriber which is assigned a first safety integrity level, and at least one second slave subscriber which is assigned a second safety integrity level. The first safety integrity level and the second safety integrity level differ from each other. A first safety code determination method is assigned to the first slave subscriber and a second safety code determination method is assigned to the second slave subscriber. The first safety code determination method and the second safety code determination method differ from each other. The master subscriber and the first slave subscriber use the first safety code determination method for interchanging a safety data block. The master subscriber and the second slave subscriber use the second safety code determination method for interchanging a safety data block.

According to another aspect, a method operates a safety control in an automation network having a master subscriber which carries out the safety control, at least one first slave subscriber which is assigned a first safety integrity level, and at least one second slave subscriber which is assigned a second safety integrity level, the first safety integrity level and the second safety integrity level differing. The master subscriber, the first slave subscriber and the second slave subscriber are connected to one another via a data transmission path and each having a safety layer and a data link layer. In a transmission mode the safety layer use a safety code determination method to determine a safety code for a safety data block to be transmitted. In the transmission mode the data link layer forms a data packet containing the safety data block and the safety code for transmission on the data transmission path. In the reception mode the data link layer extracts a safety data block and an associated safety code from a data packet received via the data transmission path. In a reception mode the safety layer verifies the safety code for the safety data block using the safety code determination method. A first safety code determination method is assigned to the first slave subscriber and a second safety code determination method is assigned to the second slave subscriber. The first safety code determination method and the second safety code determination method differ from each other. The master subscriber and the first slave subscriber use the first safety code determination method for interchanging a safety data block. The master subscriber and the second slave subscriber use the second safety code determination method for interchanging a safety data block.

According to another aspect, an automation network has a master subscriber which carries out safety control, at least one first slave subscriber which is assigned a first safety integrity level, and at least one second slave subscriber which is assigned a second safety integrity level, the first safety integrity level and the second safety integrity level differing. The master subscriber, the first slave subscriber and the second slave subscriber are connected to one another via a data transmission path and each having a safety layer and a data link layer. A first safety code determination method is assigned to the first slave subscriber and a second safety code determination method is assigned to the second slave subscriber. The first safety code determination method and the second safety code determination method differ from each other. The master subscriber and the first slave subscriber use the first safety code determination method for interchanging a safety data block. The master subscriber and the second slave subscriber use the second safety code determination method for interchanging a safety data block.

BRIEF DESCRIPTION OF THE DRAWINGS

The invention is explained in more detail below with reference to exemplary embodiments, in which:

FIGS. 3A, 3B and 3C show the residual error rate and the Hamming distance for generator polynomials used in the safety integrity levels SIL1 to SIL3.

DETAILED DESCRIPTION

Figure 1:
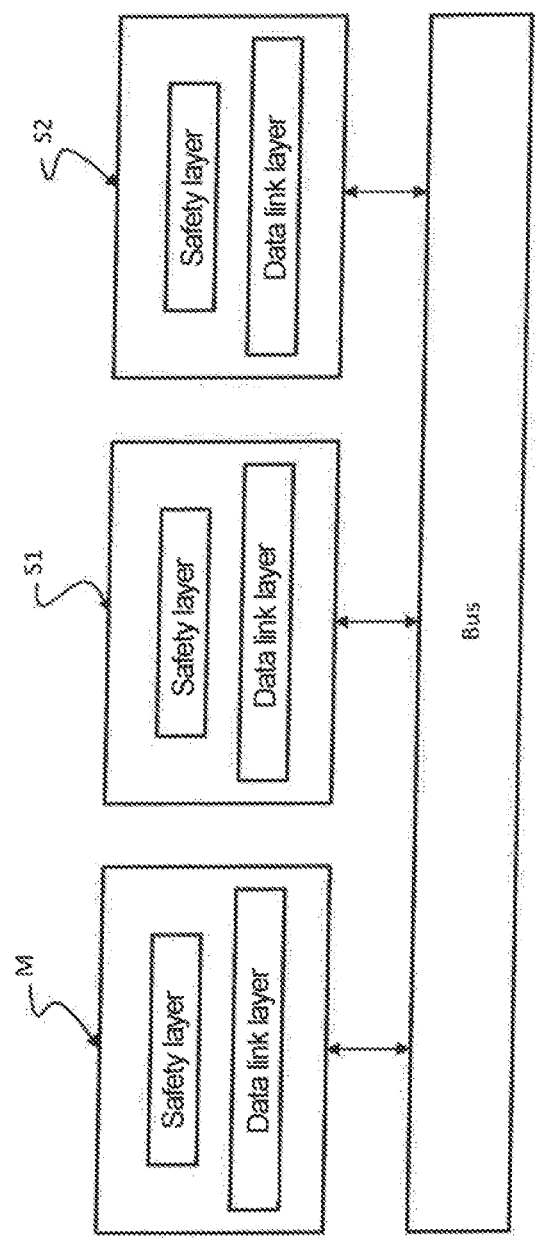
FIG. 1 schematically shows the structure of an automation network according to the invention having a master subscriber which carries out safety control, a first slave subscriber which is assigned a first safety integrity level, and a second slave subscriber which is assigned a second safety integrity level.

Industrial automation uses networks in which the devices of a sensor/actuator level, such as I/O modules, measured value loggers, valves, drives etc., which are arranged in a decentralized manner, communicate with an automation computer of a control level via a powerful bus system. Field bus systems are preferably used as bus systems in automation networks.

Automation networks generally have a hierarchical structure and operate according to the master/slave principle. The master subscribers are assigned to the control level and are the active subscribers which have access authorization to the communication connection in the automation network and determine the data traffic. The slave subscribers are part of the sensor/actuator level and form the passive subscribers. They do not have their own access authorization to the bus system and can only acknowledge received data or can transmit data to a master subscriber at the request of the latter.

A central requirement imposed on automation systems is the secure and reliable data transmission. In order to eliminate risks to humans and the environment, it must be ensured that the useful data are transmitted between the slave subscribers of the sensor/actuator level and the master subscribers of the control level without any errors or alternatively that errors in the data transmission are reliably detected. Safety measures are therefore implemented in automation systems and ensure that errors in the data transmission are detected with a high degree of probability in order to thus minimize the risk of undetected errors. The transmitting subscriber therefore provides the data to be transmitted with a safety code which is then verified by the receiving subscriber. The cyclic redundancy checking method, also called CRC method, is generally used as the method for determining the safety code.

In the CRC method, before data transmission, a check character string is determined for the data block to be transmitted in the transmitter with the aid of a generator polynomial, which check character string is then appended to the data block and is transmitted together with the latter to the receiver. The receiver verifies the transmitted check character string with the aid of the same generator polynomial as was used by the transmitter to calculate the check character string for the transmitted data packet in order to determine whether data have been transmitted without corruption.

Not all subscribers in the automation network generally have the same relevance to safety. The number of safety functions in an automation network is also generally smaller than the number of control functions which are not relevant to safety.

In order to classify the danger to humans and the environment from the automation network, there is an obligatory requirement to carry out a risk analysis. The central standard is IEC/EN 62061 which specifies the safety-related performance of programmable electronic control systems which is needed to reduce the risk. In order to subdivide the safety-related performance, the standard IEC/EN 62061 defines four safety integrity levels (SIL, SIL1 to SIL4). In this case, the individual safety integrity levels stipulate the permissible residual error probability for the occurrence of an error. According to safety integrity level SIL1 the average probability of a dangerous failure per hour ($PFH_D$) is less than $10^{-5}$, but must be greater than $10^{-6}$. The range of values is less than $10^{-6}$ but greater than $10^{-7}$ for the safety integrity level SIL2, is less than $10^{-7}$ but greater than $10^{-8}$ for the safety integrity level SIL3, and is less than $10^{-8}$ but greater than $10^{-9}$ for the safety integrity level SIL4. In addition to the standard IEC/EN 62061, the standard EN ISO 13849 which is easier to apply and recognizes the performance levels A to E is also often used.

The safety requirement required for the individual subscribers in the automation network depends on the safety functions assigned to the respective subscriber. Automation networks are therefore often operated with subscribers which have different safety requirements on account of their safety functions.

FIG. 1 schematically shows the basic structure of an automation network having a master subscriber M which forms the control level, and two slave subscribers S1 and S2 which represent the sensor/actuator level. The master subscriber M and the two slave subscribers S1, S2 are connected to one another via a serial bus via which the data traffic takes place between the subscribers. In this case, the data traffic in the automation network is organized by the master subscriber M in the form of data packets which are composed of control data and useful data, the control data in the data packet containing an item of address information which identifies the transmitter and/or receiver.

In the automation network shown in FIG. 1, both slave subscribers S1 and S2 are relevant to safety. More than two safety-relevant slave subscribers may naturally be provided. In addition to safety-relevant subscribers, subscribers which are not relevant to safety may also be incorporated in the automation network. The control level in the automation network may also be divided among a plurality of master subscribers.

Data are generally transmitted in the automation network in a consistent manner, preferably on the basis of the Ethernet protocol, in which case all safety-relevant subscribers in the automation system, that is to say the master subscriber M and the two slave subscribers S1, S2, have, in addition to the data link layer for processing the standard data, a further superordinate safety layer for processing the safety data. The safety layer and the data link layer are encapsulated in the safety-relevant subscribers completely from one another in order to prevent the risk of corruption when processing safety data. This design of the safety-relevant subscribers makes it possible to reduce the outlay on hardware and software since both safety data and standard useful data can be transmitted with the aid of a standard protocol such as the Ethernet protocol.

Figure 2:
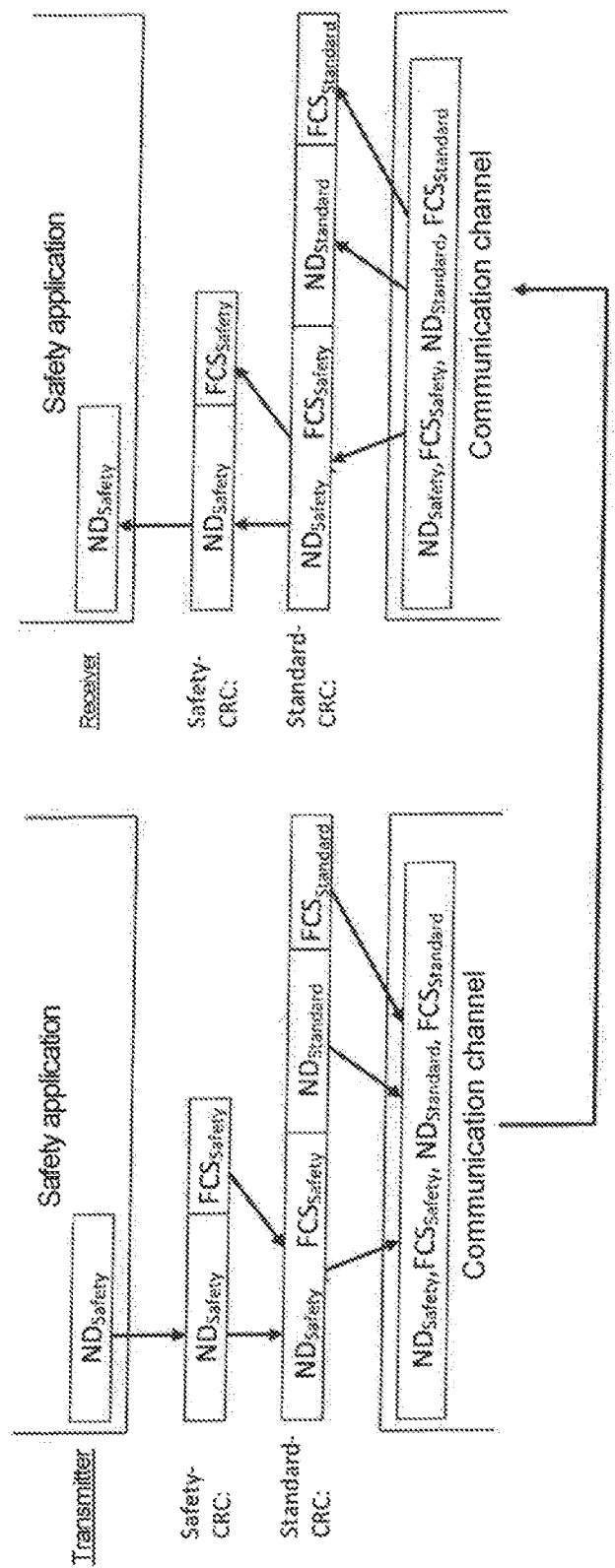
FIG. 2 shows a possible design of the data transmission in the automation system shown in FIG. 1.

FIG. 2 shows data transmission in the automation system shown in FIG. 1. A safety code $FCS_{Safety}$ for a safety data block $ND_{Safety}$ to be transmitted is generated in the safety layer of the transmitter with the aid of a safety code determination method Safety CRC. If the cyclic redundancy checking method is used as the safety code determination method Safety CRC, as shown in FIG. 2, the safety code is determined as a safety data block check character string using a safety data generator polynomial. The safety code $FCS_{Safety}$ is then appended to the safety data block $ND_{Safety}$ and is transferred to the data link layer in the form of a safety block.

The safety block is then embedded in a standard data block $ND_{Standard}$ in the data link layer of the transmitter, a further safety code $FCS_{Standard}$ preferably being determined with the aid of a further safety code determination method Standard CRC. If the cyclic redundancy checking method is again used as the safety code determination method Standard CRC, as shown in FIG. 2, a standard data generator polynomial which is changed in comparison with the safety data generator polynomial used to calculate the safety data block check character string is used.

The data link layer then transmits the standard data packet block $ND_{Standard}$ containing the embedded safety data block $ND_{Safety}$ and the safety code $FCS_{Safety}$ and appended standard data block check character string $FCS_{Standard}$ and transmits it via the bus communication channel to the receiver. Two cyclic redundancy checks are then carried out again in the receiver, as shown in FIG. 2. The standard data block check character string $FCS_{Standard}$ in the transmitted data packet is verified in the data link layer of the receiver with the aid of the cyclic redundancy check Standard CRC using the standard data generator polynomial. The safety data block check character string $FCS_{safety}$ in the safety data packet embedded in the transmitted data packet is then verified further in the safety layer of the receiver with the aid of the cyclic redundancy check Safety CRC using the safety data generator polynomial. If both checks lead to a positive result, the safety data can be used. Otherwise, they are discarded. The receiver then waits for a further data packet, uses substitute data or carries out safety measures.

In this case, the safety data generator polynomial preferably generates a safety data block check character string of the length R. A generator polynomial whose Hamming distance from a fictitious calculation of a check character string for the standard data block differs from the Hamming distance for the check character string for the safety data block which is longer by R is then preferably used as the safety data generator polynomial. This procedure ensures that distortions in the safety data block character string can be reliably detected even when the safety layer and the data transmission are separate from one another in the safety-relevant subscriber, as provided in the automation system shown in FIG. 1.

If safety-relevant subscribers are assigned to different safety integrity levels in an automation network, considerable safety-related problems may occur in the data traffic. In the automation network shown in FIG. 1, the slave subscriber S1 complies with the safety requirement standard SIL3, while the slave subscriber S2 complies with the safety requirement standard SIL2. If the slave subscriber S2 having the low SIL level 2 generates data packets, a valid data packet can be generated for the slave subscriber S1 having the higher SIL level 3 if a simple error occurs in said slave subscriber S2, which error is reliable as part of the low SIL level 2 in the slave subscriber. Although the slave subscriber S1 would detect the error in the transmitted data packet from the slave subscriber S2 with a high degree of probability, the high SIL level 3 required for the slave subscriber S1 is no longer complied with on account of the high error rate which then occurs.

This problem is avoided according to the invention by virtue of the fact that the subscriber which is assigned a first safety integrity level uses a first safety code determination method for interchanging data packets and the subscriber which is assigned a second safety integrity level uses a second safety code determination method for interchanging data packets. If a cyclic redundancy checking method is always used as the safety code determination method, different safety code generator polynomials are used for the subscribers having the different safety requirements. This procedure makes it possible to reliably detect misdirection during data transmission since the data traffic between the groups of subscribers having the different safety requirements can be clearly delimited from one another with the aid of the different safety codes.

In the automation system shown in FIG. 1, the procedure is such that the master subscriber M and the slave subscriber S1 use a first generator polynomial suitable for the safety integrity level SIL3 for interchanging data. In contrast, for interchanging data with the second slave subscriber S2 whose safety integrity level is SIL2, the master subscriber M and the slave subscriber S2 use a different generator polynomial suitable for the safety integrity level SIL2.

FIG. 3 shows, by way of example, three different generator polynomials each assigned to one of the safety integrity levels SIL1, SIL2 and SIL3. 0x12A23 is used as the generator polynomial for the SIL level 3, 0x17B0F is used as the generator polynomial for the SIL level 2 and 0x1571F is used as the generator polynomial for the SIL level 1. In this case, the Hamming distance and the residual error probability are respectively stated for the individual generator polynomials. In this case, the Hamming distance indicates how many characters in a data record must at least be corrupted so that undetected corruption can occur despite the safety measure of the cyclic redundancy check which is used. In this case, the generator polynomials are selected in such a manner that the Hamming distance of the generator polynomial complies with the residual error probability for the occurrence of an error which is required according to the safety integrity level. In this case, the procedure is fundamentally such that, if different residual error probabilities for the occurrence of an error are assigned to the safety integrity levels, the Hamming distance of the assigned generator polynomials differs.

Assigning different safety code determination methods to different groups of subscribers in the automation network, each representing a safety integrity level, also makes it possible to easily expand the automation network. If a new group of slave subscribers having an assigned safety integrity level is intended to be connected to the automation network, an independent safety code determination method for interchanging data with one another and with the master subscribers is assigned to the added group. With this procedure, it is no longer necessary to take into account the remaining slave subscribers when configuring the new group of slave subscribers in the automation network since the different groups of subscribers each assigned a safety integrity level execute the data traffic independently of one another with the aid of the separate safety code determination methods. Only the master subscriber must speak to all groups of subscribers and must be able to carry out the safety code determination method provided for interchanging data packets with the respective group of subscribers.

Assigning different safety code determination methods to groups of subscribers which are delimited from one another by their safety integrity levels also makes it possible to allocate the addresses to the subscribers in the respective safety groups independently of one another. By carrying out respectively independent safety code determination methods, the subscribers in the various groups can then also have identical addresses, for example, since data packet misdirection is reliably prevented by the separate safety code determination methods. This is particularly advantageous when, like in the design shown in FIG. 2, the safety data block is transmitted in a manner encapsulated in the standard data block and the address is no longer explicitly present in the safety data block, but rather enters only the check character string. During address allocation according to the invention, it is only necessary for the subscribers within a safety integrity level to have a unique address.

For operating safety control in an automation network having a master subscriber which carries out the safety control, at least one first slave subscriber which is assigned a first safety integrity level, and an at least second slave subscriber which is assigned a second safety integrity level, the master subscriber, the first slave subscriber and the second slave subscriber being connected to one another via a data transmission path and each having a safety layer and a data link layer, a safety code determination method is used in the safety layer of the respective subscriber to determine, in the transmission mode, a safety code for a safety data block to be transmitted, and a data packet containing the safety data block and the safety code is formed in the data link layer of the respective subscriber for transmission on the data transmission path, and a safety data block and an associated safety code are extracted from a data packet received via the data transmission path in the reception mode in the data link layer of the respective subscriber, and the safety code for the safety data block is verified using the safety code determination method in the safety layer of the respective subscriber. In this case, a first safety code determination method is assigned to the first slave subscriber and a second safety code determination method is assigned to the second slave subscriber, the master subscriber and the first slave subscriber using the first safety code determination method for interchanging a safety data block, and the master subscriber and the second slave subscriber using the second safety code determination method for interchanging a safety data block.

A separate safety code determination method is used for communication between subscribers in the automation network having the same safety integrity level. Mutual undetected influence of subscribers having a different safety integrity level, in particular, is therefore excluded. Misdirection of data packets in the data traffic between subscribers having a different safety integrity level is reliably detected. Therefore, data traffic between subscribers having any safety integrity level is also possible in the automation network without safety-related problems.

The first and second safety code determination methods may cyclic redundancy checking methods, a first safety code generator polynomial being assigned to the first safety code determination method and a second safety code generator polynomial being assigned to the second safety code determination method. In this case, the Hamming distance of the first safety code generator polynomial preferably differs from the Hamming distance of the second safety code generator polynomial. This procedure makes it possible to use the current standard safety mechanism of a cyclic redundancy check for both safety code determination methods, thus making it possible to dispense with additional time-consuming safety measures which also necessitate additional hardware and software. Setting the Hamming distance of the first and second safety code generator polynomials makes it possible to ensure the probability of detecting errors in the data packet, as is required for the respective safety integrity level.

The automation network for the subscribers may have the first safety integrity level can be designed completely separately from the design of the automation network for the subscribers having the second safety integrity level. Identical addresses can then be used in both network regions without resulting in misdirection in the data traffic since an independent safety code determination method which prevents such misdirection is assigned to each network region.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for operating safety control in an automation network having a master subscriber which carries out the safety control, at least one first slave subscriber which is assigned a first safety integrity level, and at least one second slave subscriber which is assigned a second safety integrity level,
   wherein the master subscriber, the first slave subscriber and the second slave subscriber are connected to one another via a data transmission path and have encapsulated safety and data link layers,
   the first safety integrity level and the second safety integrity level differing,
   a first safety code determination method being assigned to the first slave subscriber and a second safety code determination method being assigned to the second slave subscriber, and
   the first safety code determination method and the second safety code determination method differing,
   wherein the master subscriber and the first slave subscriber use the first safety code determination method for interchanging a first safety data block, the first safety data block containing a first item of address information, the first item of address information including an address allocation for the first slave subscriber,
   wherein the master subscriber and the second slave subscriber use the second safety code determination method for interchanging a second safety data block, the second safety data block containing a second item of address information, the second item of address information including an address allocation for the second slave subscriber,
   wherein the interchanging of the first safety data block comprises:
      determining a first safety code for the first safety data block by the first safety code determination method, the first safety code being appended to the first safety data block,
      embedding the first safety data block and the first safety code being appended to the first safety data block in a first standard data block,
      determining a first standard code for the first standard data block by a standard code determination method, the first standard code being appended to the first standard data block to form a first data packet,
      transmitting the first data packet,
      verifying the first standard code for the first standard data block by the standard code determination method,
      extracting the first safety data block and the first safety code being appended to the first safety data block from the first standard data block, and
      verifying the first safety code for the safety data block by the first safety code determination method, and
   wherein the interchanging of the second safety data block comprises:
      determining a second safety code for the second safety data block by the second safety code determination method, the second safety code being appended to the second safety data block,
      embedding the second safety data block and the second safety code appended to the second safety data block in a second standard data block,
      determining a second standard code for the second standard data block by a standard code determination method, the second standard code being appended to the second standard data block to form a second data packet,
      transmitting the second data packet,
      verifying the second standard code for the second standard data block by the standard code determination method,
      extracting the second safety data block and the second safety code being appended to the second safety data block from the second standard data block, and
      verifying the second safety code for the second safety data block by the second safety code determination method.

2. The method as claimed in claim 1, the first and second safety code determination methods carrying out a cyclic redundancy check, a first safety code generator polynomial being assigned to the first safety code determination method and a second safety code generator polynomial being assigned to the second safety code determination method,
   the master subscriber and the first slave subscriber using the first safety code generator polynomial for the cyclic redundancy check for interchanging the first safety data block, and the master subscriber and the second slave subscriber using the second safety code generator polynomial for the cyclic redundancy check for interchanging the second safety data block.

3. The method as claimed in claim 2, different residual error probabilities for the occurrence of an error being assigned to the first and second safety integrity levels, and the Hamming distance of the first safety code generator polynomial differing from the Hamming distance of the second safety code generator polynomial.

4. The method as claimed in claim 1, address allocation for the at least first slave subscriber having the first safety integrity level and address allocation for the at least second slave subscriber having the second safety integrity level being carried out independently of one another.

5. A method for operating safety control in an automation network having a master subscriber which carries out the safety control, at least one first slave subscriber which is assigned a first safety integrity level, and at least one second slave subscriber which is assigned a second safety integrity level, the first safety integrity level and the second safety integrity level differing,
- the master subscriber, the first slave subscriber and the second slave subscriber being connected to one another via a data transmission path and each having a safety layer and a data link layer, wherein the safety layer and the data link layer are encapsulated in the subscribers completely from one another,
- wherein in a transmission mode, the safety layer uses a safety code determination method to determine a safety code for a safety data block to be transmitted, and the data link layer forms a data packet containing the safety data block and the safety code for transmission on the data transmission path, and
- wherein in a reception mode, the data link layer extracts a safety data block and an associated safety code from a data packet received via the data transmission path and the safety layer verifies the safety code for the safety data block using the safety code determination method,
- a first safety code determination method being assigned to the first slave subscriber and a second safety code determination method being assigned to the second slave subscriber,
- the first safety code determination method and the second safety code determination method differing, and
- the master subscriber and the first slave subscriber using the first safety code determination method for interchanging a first safety data block, and the master subscriber and the second slave subscriber using the second safety code determination method for interchanging a second safety data block,
- wherein the first and second safety code determination methods carry out a cyclic redundancy check, a first safety code generator polynomial being assigned to the first safety code determination method and a second safety code generator polynomial being assigned to the second safety code determination method,
- wherein the master subscriber and the first slave subscriber use the first safety code generator polynomial for the cyclic redundancy check for interchanging the first safety data block, and the master subscriber and the second slave subscriber uses the second safety code generator polynomial for the cyclic redundancy check for interchanging the second safety data block, and
- wherein different residual error probabilities for the occurrence of an error being assigned to the first and second safety integrity levels, and the Hamming distance of the first safety code generator polynomial differing from the Hamming distance of the second safety code generator polynomial, wherein the first safety code generator polynomial is selected in such a manner that the Hamming distance of the first safety code generator polynomial complies with the residual error probability for the occurrence of an error according to the first safety integrity level and wherein the second safety code generator polynomial is selected in such a manner that the Hamming distance of the second safety code generator polynomial complies with the residual error probability for the occurrence of an error according to the second safety integrity level.

6. The method as claimed in claim 5, address allocation for the at least first slave subscriber having the first safety integrity level and address allocation for the at least second slave subscriber having the second safety integrity level being carried out independently of one another.

7. An automation network having a master subscriber which carries out safety control, at least one first slave subscriber which is assigned a first safety integrity level, and at least one second slave subscriber which is assigned a second safety integrity level, the first safety integrity level and the second safety integrity level differing,
- the master subscriber, the first slave subscriber and the second slave subscriber being connected to one another via a data transmission path and each having a safety layer and a data link layer, wherein the safety layer and the data link layer are encapsulated in the subscribers completely from one another,
- a first safety code determination method being assigned to the first slave subscriber and a second safety code determination method being assigned to the second slave subscriber, and
- the first safety code determination method and the second safety code determination method differing,
- wherein the master subscriber and the first slave subscriber use the first safety code determination method for interchanging a first safety data block, the first safety data block containing a first item of address information, the first item of address information including an address allocation for the first slave subscriber,
- wherein the master subscriber and the second slave subscriber use the second safety code determination method for interchanging a second safety data block, the second safety data block containing a second item of address information, the second item of address information including an address allocation for the second slave subscriber,
- wherein the automation network interchanges the first safety data block by:
  - determining a first safety code for the first safety data block by the first safety code determination method, the first safety code being appended to the first safety data block,
  - embedding the first safety data block and the first safety code being appended to the first safety data block in a first standard data block,
  - determining a first standard code for the first standard data block by a standard code determination method, the first standard code being appended to the first standard data block to form a first data packet,
  - transmitting the first data packet,
  - verifying the first standard code for the first standard data block by the standard code determination method,
  - extracting the first safety data block and the first safety code being appended to the first safety data block from the first standard data block, and
  - verifying the first safety code for the safety data block by the first safety code determination method, and
- wherein the automation network interchanges the second safety data block by determining a second safety code for the second safety data block by the second safety code determination method, the second safety code being appended to the second safety data block, embedding the second safety data block and the second safety code appended to the second safety data block in a second standard data block, determining a second standard code for the second standard data block by the standard code determination method, the second standard code being appended to the second standard data block to form a second data packet, transmitting the second data packet, verifying the second standard code for the second standard data block by the standard code determination method, extracting the second safety data block and the second safety code being appended to the second safety data block from the second standard data block, and verifying the second safety code for the second safety data block by the second safety code determination method.

8. The automation network as claimed in claim 7, the first and second safety code determination methods carrying out a cyclic redundancy check, a first safety code generator polynomial being assigned to the first safety code determination method and a second safety code generator polynomial being assigned to the second safety code determination method, the master subscriber and the first slave subscriber using the first safety code generator polynomial for the cyclic redundancy check for interchanging a safety data block, and the master subscriber and the second slave subscriber using the second safety code generator polynomial for the cyclic redundancy check for interchanging a safety data block.

9. The automation network as claimed in claim 8, different residual error probabilities for the occurrence of an error being assigned to the first and second safety integrity levels, and the Hamming distance of the first safety code generator polynomial differing from the Hamming distance of the second safety code generator polynomial.

10. The automation network as claimed in claim 7, address allocation for the at least first slave subscriber having the first safety integrity level and address allocation for the at least second slave subscriber having the second safety integrity level being carried out independently of one another.

11. The automation network as claimed in claim 7, the data transmission path being an Ethernet-based field bus.

* * * * *